United States Patent

[11] 3,583,543

| [72] | Inventors | Attilio Angioletti<br>Via Mameli 10<br>Sergio Marocco, Via Elba 7, both of Milan,<br>Italy |
|---|---|---|
| [21] | Appl. No. | 780,921 |
| [22] | Filed | Dec. 3, 1968 |
| [45] | Patented | June 8, 1971 |
| [32] | Priority | Dec. 6, 1967 |
| [33] | | Italy |
| [31] | | 23590 |

[54] PASSENGER CONVEYOR
10 Claims, 9 Drawing Figs.

[52] U.S. Cl. .................................................. 198/16, 104/25
[51] Int. Cl. .................................................. A63g 1/00, B66b 9/12
[50] Field of Search ........................................ 198/16, 110; 104/25

[56] References Cited
UNITED STATES PATENTS
1,412,896   4/1922   Sachs .......................... 104/25
FOREIGN PATENTS
724,088   1/1932   France .......................... 198/16

*Primary Examiner*—Edward A. Sroka
*Attorney*—Stevens, Davis, Miller & Mosher

ABSTRACT: A passenger conveyor having a high speed central portion and initial and terminal portions of gradually building up and slowing down speeds including a means for effecting this speed variation comprising articulated parallelogram frame members which are adjustable, according to the spacing of guides along which they travel, to thereby vary the relative positioning of overlapping adjacent plates forming the passenger supporting surface.

INVENTORS
ATTILIO ANGIOLETTI,
SERGIO MAROCCO

FIG.6

INVENTORS
ATTILIO ANGIOLETTI,
SERGIO MAROCCO

BY Stevens, Davis, Miller & Mosher
ATTORNEYS

PASSENGER CONVEYOR

The present invention concerns a passenger conveyor of the type comprising an initial accelerated zone and a terminal decelerated zone.

The advantages afforded by a passenger conveyor are remarkable; in fact it can be used in place of trams, taxis, buses and private cars in the historical center of cities; can constitute a useful aid to underground railways, on account of the possibility of allowing intermediate way-in and way-out passages along the runs between two contiguous stops, of connecting different lines to one another, and of facilitating the approach to the underground from particularly distant areas; can be used in railways and air terminals to expedite the passenger traffic and can solve many problems concerning the relocation of labor inside large factories.

The passenger conveyor constitutes a very good solution to the above-mentioned problems, owing to the following features: it provides continuous operation and ensures high safety, is silent, does not require operators who have to travel with it, does not produce exhaust fumes, has reduced overall dimensions and a light structure so that the cost of its construction, installation, and maintenance, as well as of power consumption, is low, and it possesses a very high ratio between installed and absorbed power since motion and speed are constant.

A passenger conveyor, however, is useful only if it travels at a rather high speed, namely of the order of 2 to 3 m./sec.

Such high speed involves in its turn, the need of having passengers embarking and disembarking without possible risk of falls; for this reason passenger conveyors have been devised, provided with an initial accelerated zone and a terminal decelerated zone. Conveyors built up in accordance with this principle are already known, but they show some disadvantages which, until the present time, have limited their use.

An already-known passenger conveyor has a supporting surface which is resilient in the direction of motion, constituted by a continuous band of elastomeric material. The resiliency is necessary because acceleration and deceleration are respectively obtained by elongation and shrinkage of the supporting surface.

The band is provided with a plurality of ribs extending perpendicular to the direction of motion, and connected to one another by ribs inclined with respect to said direction. The elasticity of the band is achieved by the fact that the angle formed by the inclined ribs with the direction of motion of the conveyor can be varied according to the stretching action exerted onto it.

The band always works under tension, so that by varying the intensity of said tension, its surface can be elongated or shortened.

A disadvantage shown by this conveyor is that hollow spaces are present between the ribs; and said hollow spaces constitute a danger for the user's safety.

A further drawback is due to the fact that since the band has to suffer elongations exceeding 100 percent, and since it must possess a considerable thickness to bear concentrated loads (passengers), the driving system is subjected to extremely high stresses.

Another already-known passenger conveyor is made of at least three independent portions, disposed in series. Each portion is a moving conveyor having its own moving members. The end portions have a low speed and the central portion has a high speed. Also in this conveyor the problem concerning the user's safety is not solved, since the user, at each change of speed portion must pay attention not to lose his balance. Moreover, if there are more than three portions constituting the conveyor, the assembly becomes considerably more complicated and therefore expensive.

The passenger conveyor in accordance with the present invention is able to eliminate the above-described disadvantages since it is free from any danger for the users and is economical both in respect to its construction and its maintenance costs.

The object of the present invention is to provide a passenger conveyor comprising initial and terminal portions of gradually variable speed, obtained by elongating and shortening the supporting surface, characterized in that said supporting surface is formed by plates in an already-known way, and that said elongation and shortening take place by virtue of the relative sliding of the adjacent plates, which are partially superimposed at the supporting surface.

The means for accomplishing the foregoing objects and other advantages, which will be apparent to those skilled in the art, are set forth in the following specification and claims, and are illustrated in the accompanying drawings dealing with two embodiments of the present invention. Reference is made now to the drawings in which:

Figure 1A:
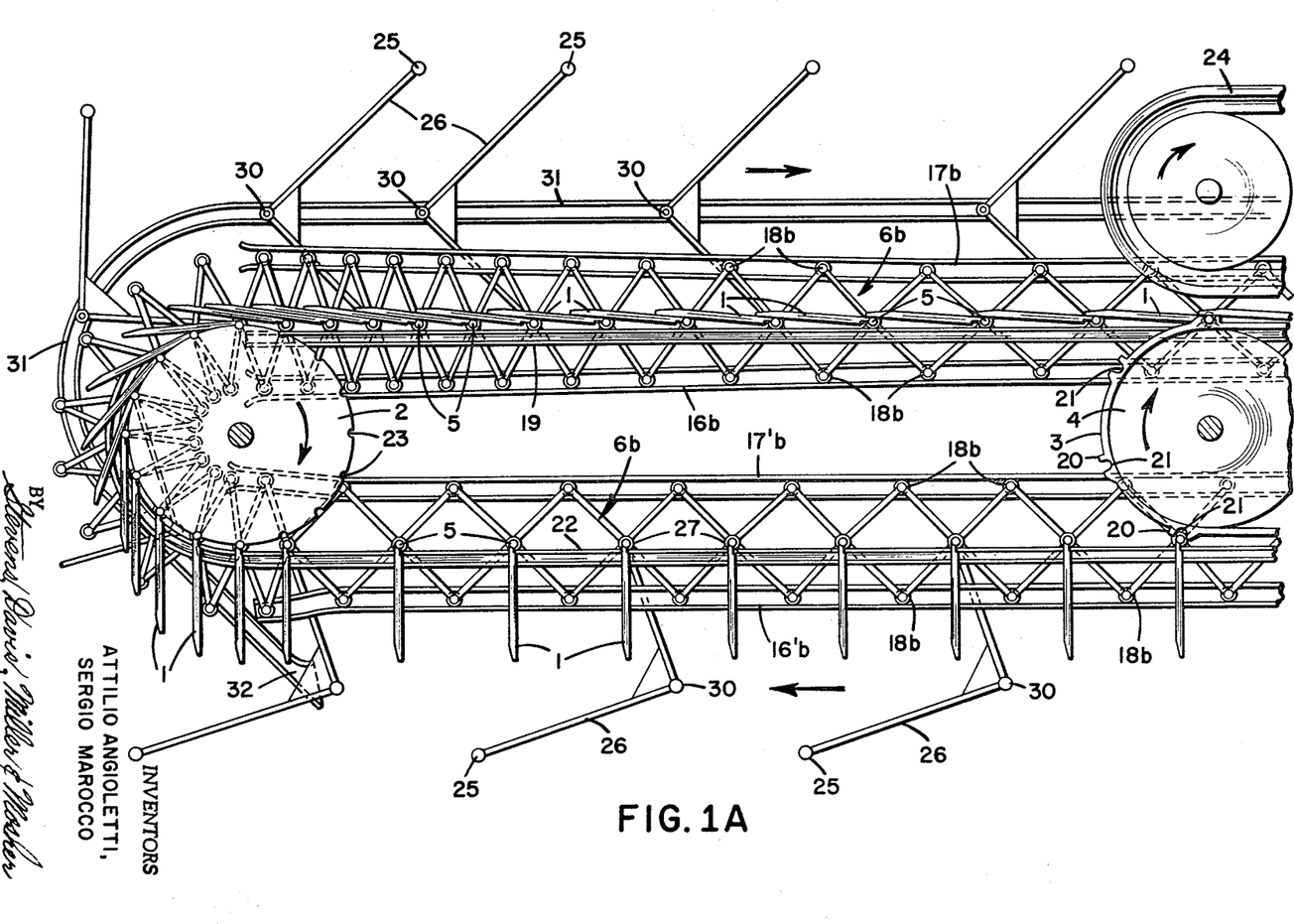
FIG. 1A represents, in side view, the accelerated zone of the conveyor.
Figure 1B:
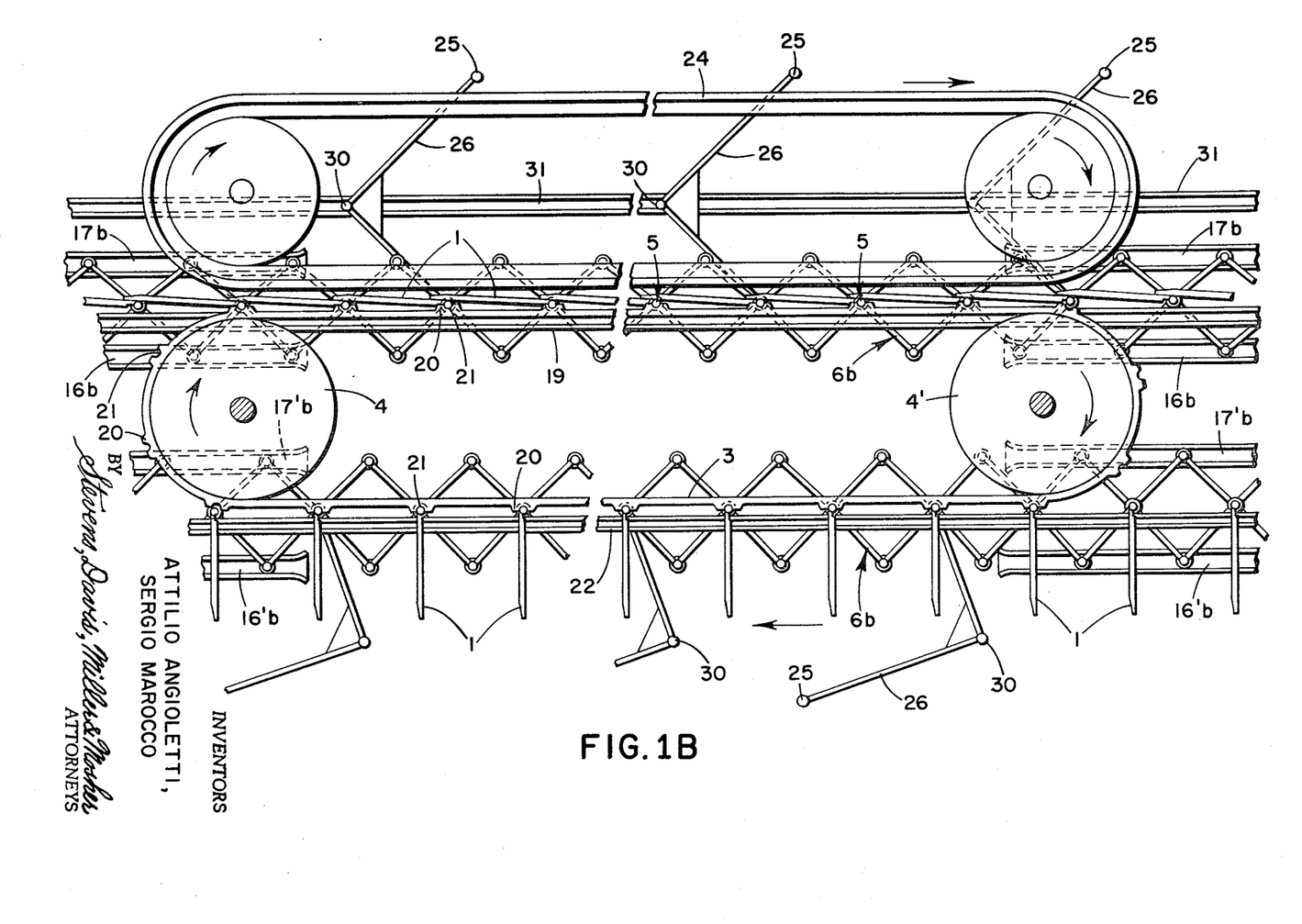
FIG. 1B represents, in side view, the intermediate zone of the conveyor, travelling at service speed.
Figure 1C:
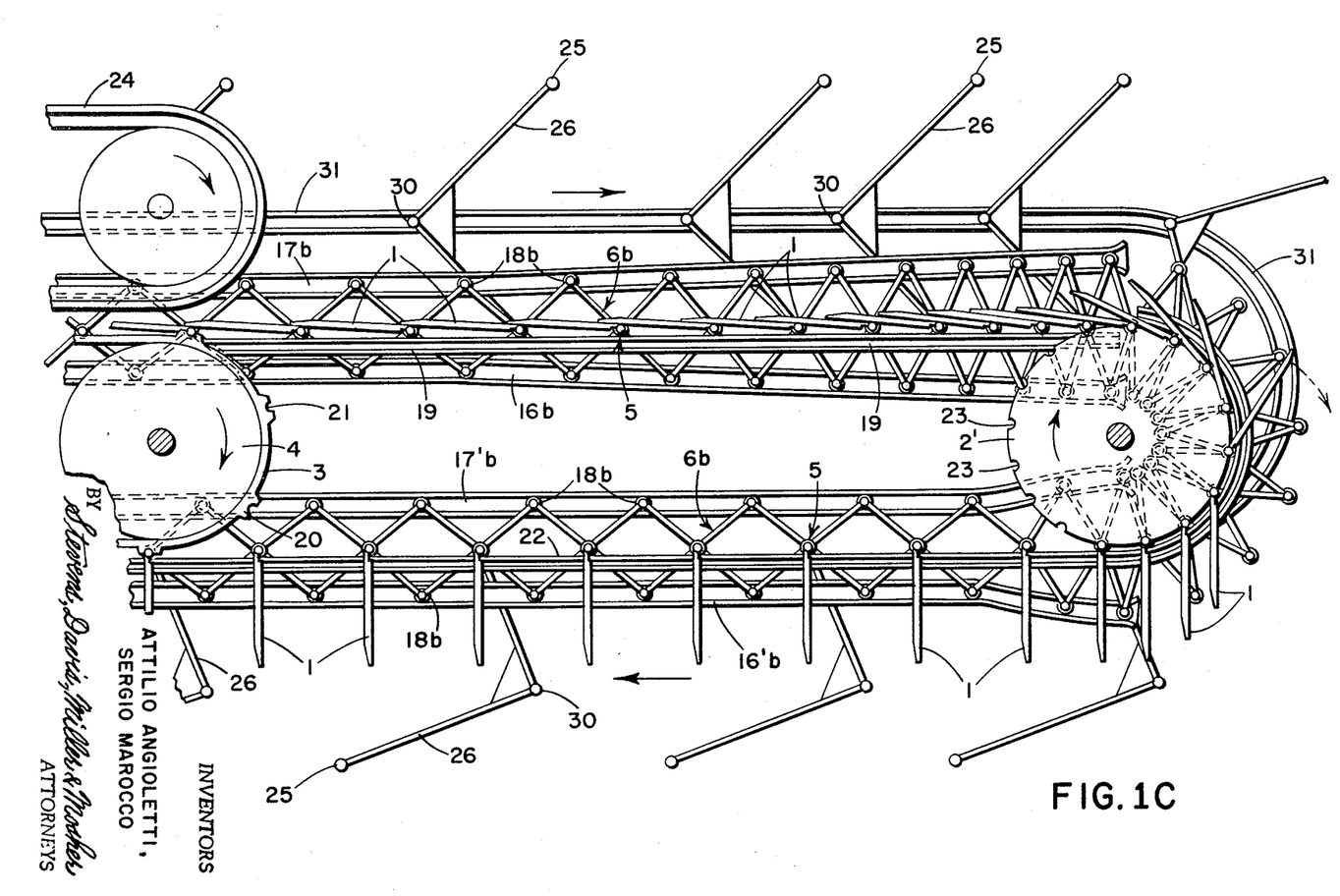
FIG. 1C represents, in side view, the decelerated zone of the conveyor.

The conveyor (FIGS. 1A, 1B, 1C) is constituted by a plurality of plates 1 which move in a closed circuit formed by two horizontal rectilinear portions connected to each other by semicircular connecting portions in which grooved transmission rollers 2 and 2' are provided.

The upper rectilinear portion, where the plates lie in substantially horizontal planes, constitutes the true conveyor, while the lower rectilinear portion, where the plates hang in substantially vertical planes, has only the function of returning each plate to the starting position on the upper portion. In order to impart the motion to the plates and therefore to the conveyor, provision is made of a dragging band 3 (FIG. 1B) in the central area of the conveyor, whose length can be of the order of hundreds of meters. The band receives the motion by drive rollers 4 and 4' and it is positioned, in the central area of the conveyor, so as to leave free two short lengths, an initial one and a terminal one, on both the rectilinear courses followed by the plates.

The initial length of the upper rectilinear portion (FIG. 1A) is the accelerated zone, while the terminal length of said upper rectilinear portion (FIG. 1C) is the decelerated zone.

In the preferred embodiment of the invention, the initial length, or accelerated zone, and the final length, or decelerated zone, have the same length. However, the length of the accelerated portion can be different from the length of the decelerated portion.

The passage of the plates 1, forming the supporting base of the conveyor, from the lower rectilinear portion to the upper rectilinear portion (FIG. 1A) and the passage of said plates from the upper rectilinear portion to the lower rectilinear portion (FIG. 1C) are ensured respectively by the rollers 2 and 2', which are provided on their cylindrical surface with grooves or recesses 23, disposed along the generatrices of said surface, and intended to receive hinges 5 of plates 1.

Figure 2A:
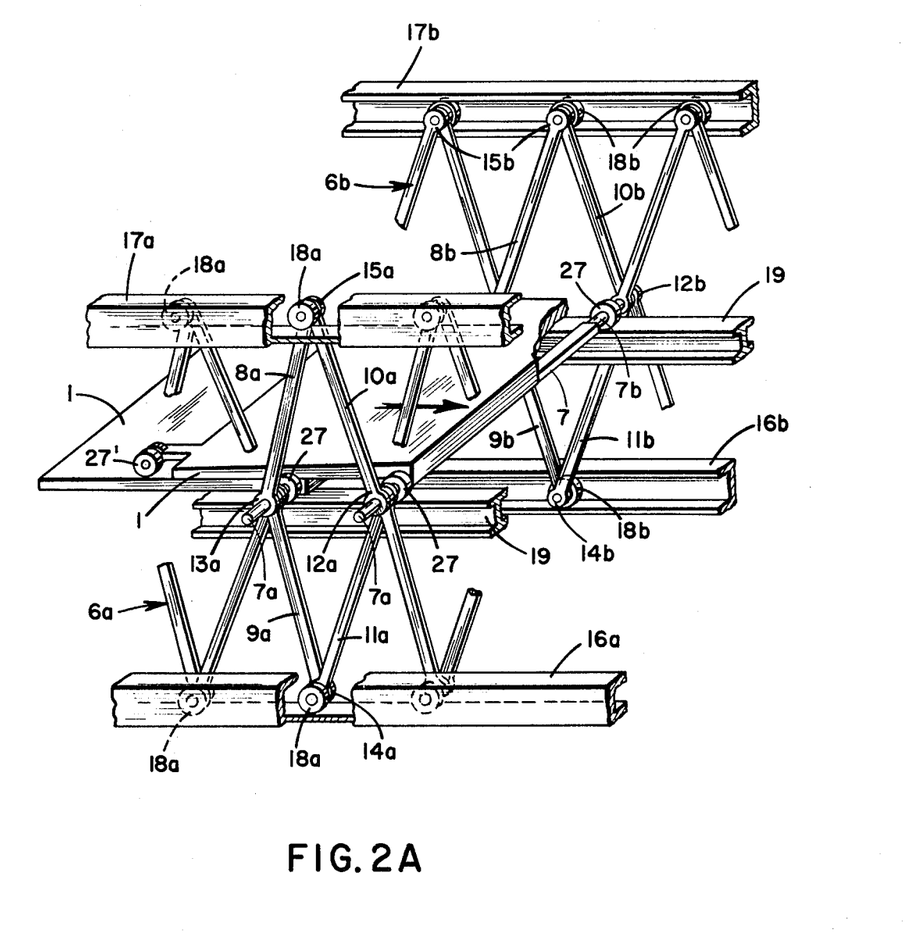
FIGS. 2A and 2B are perspective views showing two positions of the mechanism for carrying out the sliding of the plates.
Figure 2B:
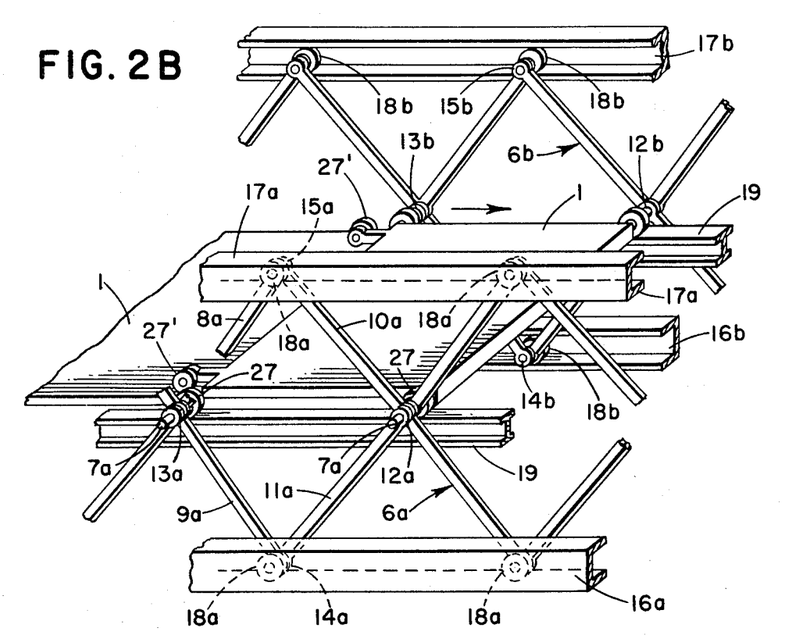

Each plate 1 is provided with a hinge 5, disposed perpendicularly to the direction of the conveyor. The provision of the hinge 5 (FIG. 1C) is due to the need for pivoting the plate about it when the plate, after having carried out its travel along the whole upper rectilinear portion, reaches the grooved roller 2' of the decelerated zone. The hinges are moreover used to carry out the connection of adjacent plates. This connection is effected through vertical articulated parallelograms 6a and 6b (FIG. 2) disposed on either side of the plates and which are parallel to the direction of motion.

For a better understanding of the following description, the articulated parallelograms indicated with 6a are considered as disposed at the right of a person looking at the direction of motion of the conveyor, and the articulated parallelograms 6b are considered as disposed at the left of said person.

The connection of the plates to one another is clearly shown in FIG. 2. The hinge 5 of each plate 1 is constituted by a small rod 7 applied under the plate, the length of which is greater than the length of the side at which it is disposed. The rod 7 protrudes laterally from the plate by two lengths 7a and 7b which have a cylindrical shape.

Each articulated parallelogram 6a is constituted by four bars 8a, 9a, 10a and 11a, connected two by two by means of hinges and forming in their whole a close circuit. The portions 7a of rods 7 belonging to two adjacent plates 1 constitute the pins of two opposite hinges 12a and 13a of the same articulated parallelogram; the other hinges 14a and 15a, also opposite, slide in guides 16a and 17a, small wheels 18a being provided in the guides. The guide 17a is positioned over the plane containing the conveyor and the guide 16a is positioned below said plane, which is the symmetry plane of the guides.

Each articulated parallelogram 6b is also constituted by four bars 8b, 9b, 10b and 11b, connected two by two by means of hinges. The portions 7b of rods 7 belonging to adjacent plates constitute the pins of two opposite hinges 12b and 13b of the same articulated parallelogram; the other two hinges 14b and 15b slide in guides 16b and 17b, small wheels 18b being provided in the guides. Also in this case the plane containing the conveyor is the symmetry plane of guides 16b and 17b.

The guides 16a, 17a, and 16b, 17b, are provided only at the initial and terminal parts of the upper rectilinear portion of the conveyor, where the dragging band 3 is not present; likewise guides 16'a, 17'a and 16'b, 17'b, analogous to the first-mentioned guides, are provided only at the initial and terminal parts of the lower rectilinear portion, where the dragging band is not present.

During travel along the upper rectilinear portion, the plates are maintained in substantially horizontal position by the fact that each plate, by its hinge at the leading edge, rides on rails 19 through the interposition of rollers 27 and also rides through the interposition of rollers 27' at the trailing edge, on top of the plate which follows it with respect to the direction of motion of the conveyor.

The relative position of a plate with respect to the adjacent plates at the initial and terminal parts of the upper rectilinear portion where the dragging band is not present, is ensured by the unit formed by the articulated parallelograms 6a and 6b and by their guides 16a, 17a, 16b, 17 b.

The same can be said for the initial and terminal parts of the lower rectilinear portion, where the dragging band is not present, where the position of a plate with respect to the adjacent plates is ensured by the unit formed the articulated parallelograms 6a and 6b and by the relative guide rails 16'a, 17'a, 16'b and 17'b.

The outer surface of the dragging band, in order to allow the plates to remain in fixed positions with respect to one another, is provided with a plurality of equally spaced projections 20 which extend across the width of the band. Each projection contains a recess 21 intended to receive the rods 7 of each plate.

In the part operating as a true conveyor, the position of the rods 7 in the recesses 21 is ensured by the weight of the plates themselves and the loads due to the passengers' weight aids this purpose.

To ensure the positioning of the rods 7 in the recesses 21, provision can be made of contrast rollers (not shown) which facilitate the retaining of the rods 7 in said recesses 21. In the lower rectilinear portion, where the plates travel depending substantially perpendicular to the dragging band, the position of the rods 7 in the recesses 21 is ensured by rails 22, which extend also to the zone of the guides 16'a, 16'b, 17'a, 17'b and along the semicircular connecting portions.

In the central area of the conveyor the plates 1 move at the same speed as the dragging band 3, to which they are temporarily held fast, while at the ends of the upper rectilinear portion their speed must be gradually varied. In particular, each plate reaches its maximum speed at the dragging band 3 and its minimum speed at the rollers 2 and 2'. The gradual speed regulation is made possible by allowing the plates to move longitudinally with respect to each other, the entity of the movement having to be constantly kept under control. This effect is obtained by means of the guides 16a, 16b, 17a and 17b.

The guides 16a and 17a (and analogously the guides 16b and 17b) in the upper rectilinear portion are at their greatest distance at the positions nearest the rollers 2 and 2'. This distance progressively decreases towards the dragging band 3 where the distance is smallest.

In particular, the distance of the guides at the rollers 2 and 2' is a function of the distance between two adjacent grooves 23 on the rollers, and the distance of the guides at the dragging band is a function of the distance between two adjacent recesses 21 of the band. Obviously, the ratio between the distance of two adjacent grooves 23 on the rollers and the distance of two adjacent recesses 21 on the dragging band is exactly equal to the ratio between the minimum speed of the plates and their service speed.

FIGS. 2A and 2B show, in enlarged scale, a pair of adjacent plates, in two positions taken in the accelerated zone of the conveyor.

The sliding of one plate on the other is due to the fact that the opposite hinges 14a, 15a and 14b, 15b of the two articulated parallelograms 6a and 6b which connect two adjacent plates are compelled to slide in the guides, and therefore are compelled to approach one another in consequence of the gradual reduction of the distance existing between the guides. The relative approach of the above-mentioned hinges originates the mutual displacement of the hinges 12a, 13a, and 12b, 13b, belonging to the same articulated parallelograms, with a consequent relative sliding movement of said adjacent plates.

The gradual and controlled relative movement of adjacent plates is not necessary in the lower rectilinear portion, since in this portion the speed of the plates is of no importance. It is only necessary to be sure that, in this portion, the hinges 5 of adjacent plates have a uniform spacing equal to the distance existing between the adjacent recesses 21 of the dragging band 3 and that, at the rollers 2 and 2', the distance between the hinges 5 be equal to the distance existing between the recesses 23 on the rollers. The variation of the distance between the hinges 5 is carried out by means of the guides 16'a, 17'a, 17'b, 17'b. However, the distance between these guides is nearly constant along their whole length, diverging only in the proximity of rollers 2 and 2'.

In order to facilitate the motion of the plates (FIG. 6), they are provided with rollers 27 at their forward edge, perpendicular to the direction of motion, and with rollers 27' on the trailing edge. By means of the rollers 27' it is possible to facilitate the sliding of one plate on the adjacent plate and by means of the rollers 27 it is possible to facilitate the forward motion of the plates, since the rollers 27 roll on the rails 19 in the upper rectilinear portion and on the rails 22 in the lower rectilinear portion and on the semicircular connection portions.

Figure 6:
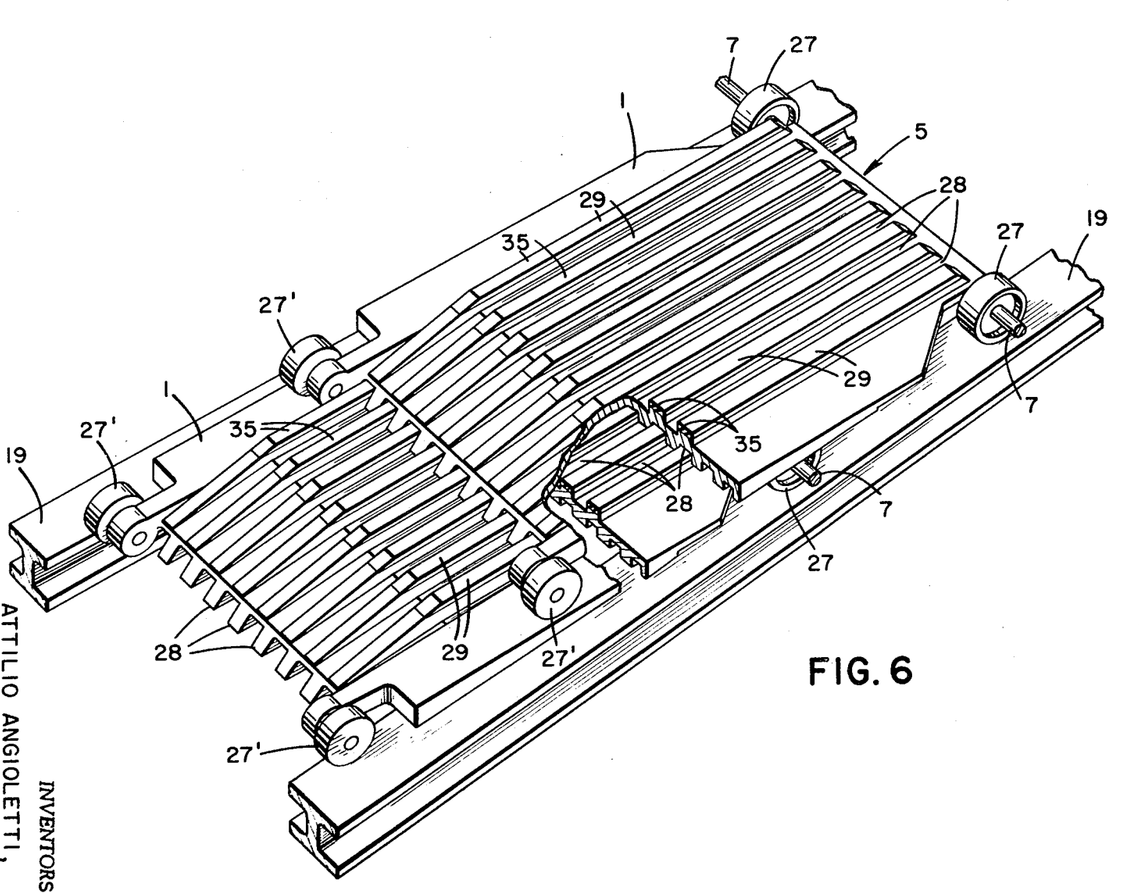
FIG. 6 shows in enlarged scale a detail of the plates.

In order to prevent possible foreign bodies from penetrating between the plates, they are provided in their upper and lower faces with grooves 28 disposed parallel to the direction of motion of the plates themselves. The dimensions of the grooves 28 and of the ribs 29, formed between the grooves, are such as to permit the insertion of the ribs of one plate into the grooves provided on the adjacent plate. Moreover, in order to prevent sliding and falls of the passengers, the surface on which they stand is covered with a layer 35 of a material having a high friction coefficient, in particular rubber.

The passenger conveyor is completed with a moving handrail 24 limited to the zone where the dragging band 3 is employed and travelling at the same speed as the band. Further, gripping handles 25 may be provided to help the passengers at the initial and terminal zones of the conveyor. The handles 25 are connected to the conveyor at the hinges 5 by means of bars 26 in such a way that they are subjected to the same speed variations to which the conveyor is subjected, and carry out the same travel as the plates.

Each bar 26 is constituted by two segments which form a right angle. A roller 30 is mounted at the vertex of this angle with its axis perpendicular to the plane of the segments. The roller 30 rolls in a rail 31 disposed at the side of the conveyor at the upper rectilinear portion and the semicircular connecting portions, but is omitted from the lower rectilinear portion.

In particular, at the roller 2 (FIG. 1A), the end 32 of the rail 31 is flared to facilitate the insertion of the rollers 30 into it.

In an alternative embodiment of the invention, the articulated parallelograms 6a and 6b are provided only at the initial and terminal zones of the conveyor, namely in the zones where the articulated parallelograms have the task of causing the plates to slide with respect to one another. The importance of this expedient is closely related to the saving of material which can be obtained in passenger conveyors of considerable length (hundreds and thousands of meters) by limiting the presence of the articulated parallelograms to the accelerated and decelerated zones, the length of which represents a small fraction of the total length of the conveyor. In particular, the articulated parallelograms 6a and 6b move between the rollers 2 and 4 in the initial zone and between rollers 2 and 4' in the terminal zone.

In a further alternative embodiment of the invention (FIGS. 3 to 5), the connection between two adjacent plates 50 is carried out by means of only one articulated parallelogram 51, lying in a horizontal plane, through which it is possible to effect the sliding of one plate on the adjacent plate in the initial and terminal zones of the conveyor. A pin 52 depends from each plate, on the face opposite to that acting as the passenger support and at the forward edge thereof. The free end of pin 52 slides in a guide 53 and, through a small connecting rod 54, is further guided in said guide 53.

Figure 3:
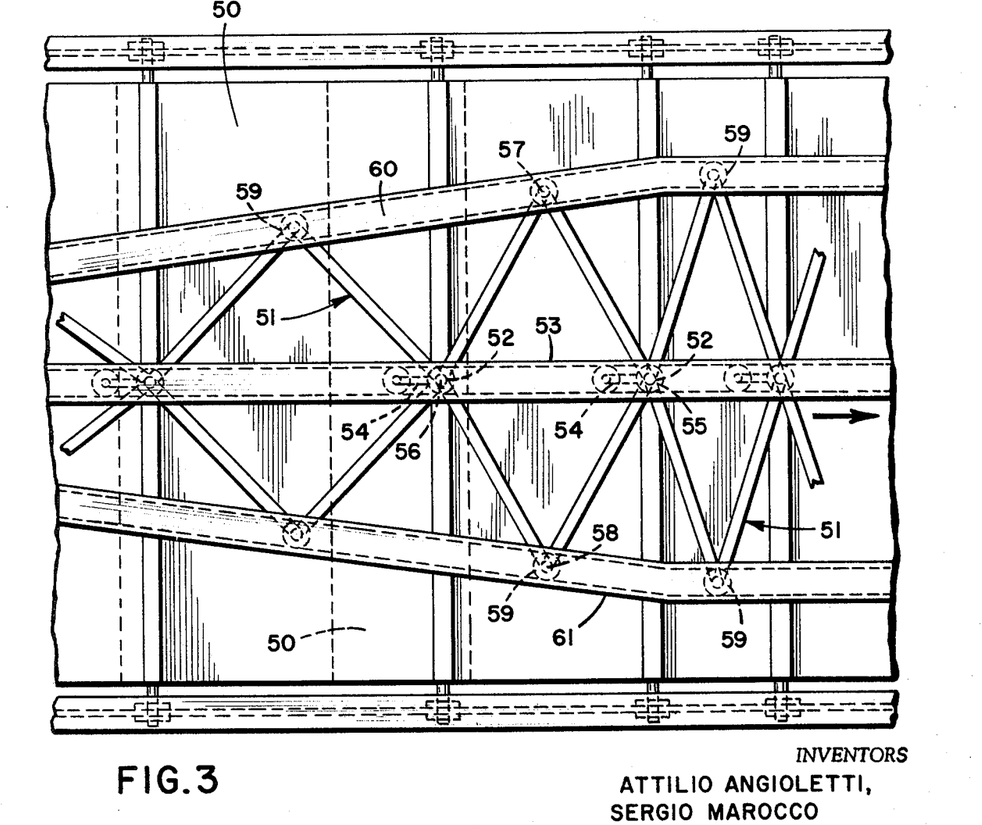
FIG. 3 shows an alternative embodiment of the conveyor, seen in plan view and from the bottom.
Figure 4:
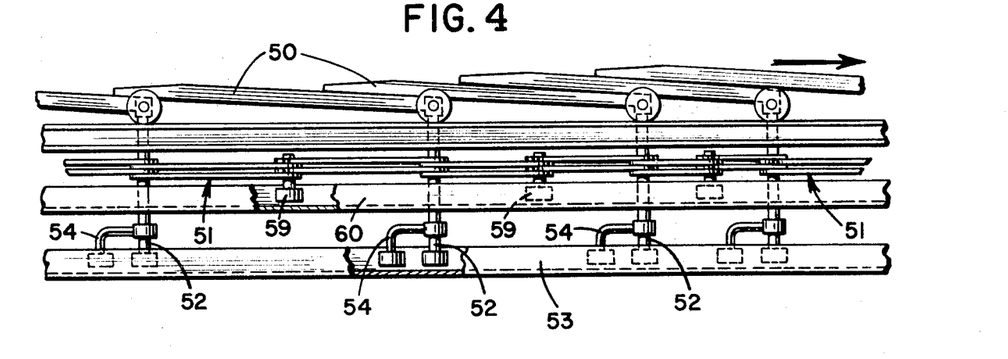
FIG. 4 is a side view of the conveyor of FIG. 3.
Figure 5:
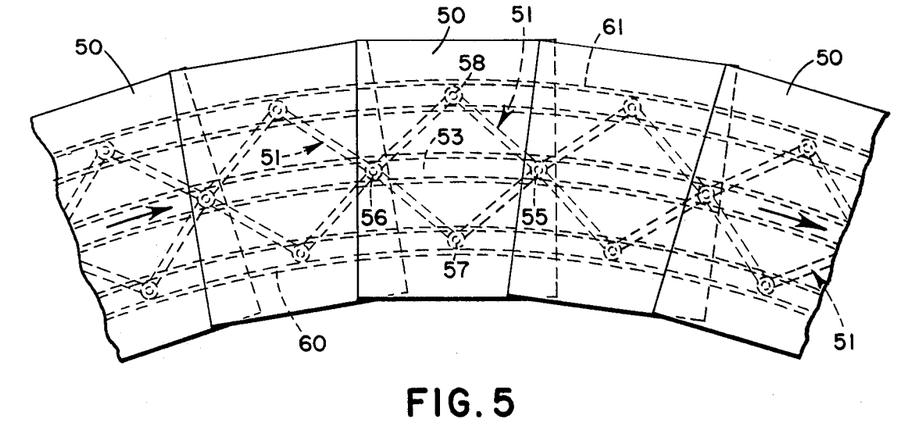
FIG. 5 is a top plan view of the conveyor of FIG. 3, arranged for cornering.

In more detail, the pin 52 of one plate 50 forms the pin of a hinge 55, while the pin 52 of the adjacent plate forms the pin of a hinge 56, which is the hinge opposite to the hinge 55 of the same articulated parallelograms 51. The other two hinges 57 and 58 of the same articulated parallelogram are guided by sliding in their respective guides 60 and 61 by means of rollers 59.

The sliding of one plate on the other is obtained by operating the parallelograms 51. For this purpose the guides 60 and 61 are at their greatest distance at the ends of the conveyor and this distance is progressively reduced as they approach the portion of the conveyor moving at high speed.

The hinges 57 and 58 are compelled to move relative to each other according to the variation of distance between the guides 60 and 61, and this results in the relative movement of the hinges 55 and 56 and therefore in the sliding of the adjacent plates 50 to which the latter hinges are connected.

If the passenger conveyor has to travel along courses including curves, the last above-described embodiment is particularly suitable, since the hinges 57 and 58, slidable in the guides 60 and 61, permit the adjacent plates to take such a position that the extensions of the sides of the plates perpendicular to the direction of motion are convergent in an ideal point having a definite distance from the conveyor.

In particular, the conveyor according to this last embodiment can carry out a circular course, while the conveyor according to the preferred embodiment is suitable for a rectilinear course or for a course whose projection in a horizontal plane is rectilinear. Courses along curves are possible also for the conveyor according to the preferred embodiment, provided that articulations are formed at the hinges of connection between the plate and the articulated parallelograms. In order to allow the conveyor to follow curved courses, in the case in which the plates are provided on their faces with grooves and ribs, it is necessary that the width of each groove be greater than the width of the ribs received therein.

The present invention may be embodied in other specific forms without departing from the spirit or essential characteristics thereof. The present embodiments are therefore to be considered in all respects as illustrative and not restrictive, the scope of the invention being indicated by the appended claims rather than the foregoing description, and all changes which come within the meaning and range of equivalency of the claims are therefore to be embraced therein.

We claim:

1. A passenger conveyor having an initial portion of increasing speed, a central high-speed portion, and a terminal portion of decreasing speed comprising a plurality of adjacent plates forming a passenger supporting surface, a plurality of interconnected articulated parallelogram means to which said plates are hinged, support frame means, guide means on said support frame means, and drive means to move said plates along said support frame means, said articulated parallelogram means engaging with said guide means to effect a relative sliding movement between adjacent plates thus effecting the increasing and decreasing speed at said initial and terminal portions, respectively.

2. A passenger conveyor according to claim 1, in which said articulated parallelogram means are substantially vertically disposed on each of the two sides of said plates parallel to the direction of motion of said conveyor, each said parallelogram means having first and second pairs of opposed hinges, each hinge of said first pair being attached to one of an adjacent pair of plates and each hinge of said second pair engaging with said guide means, whereby the relative movement of said second pair of hinges in said guides is transmitted to said plates through said articulated parallelogram means to effect the sliding movement of said plates.

3. A passenger conveyor according to claim 1, in which said articulated parallelogram means are substantially horizontally disposed beneath said plates, each said articulated parallelogram means having first and second pairs of opposed hinges, rod means depending from the bottom of the leading edge of each said plate, said rod means of adjacent plates engaging with said first pair of hinges, each hinge of said second pair of hinges engaging in said guide means whereby the relative movement of said second pair of hinges in said guides is transmitted through said articulated parallelogram means to effect the sliding movement of said plates.

4. A passenger conveyor according to claim 1, further comprising a dragging band forming said central high-speed portion, means on said band for successively engaging each of said plurality of plates.

5. A passenger conveyor according to claim 1, further comprising roller means mounted on the side edges of each of said plates to facilitate the sliding movement thereof.

6. A passenger conveyor according to claim 1, further comprising means forming a nonskid surface on the passenger supporting surface of said plates.

7. A passenger conveyor according to claim 1, further comprising a plurality of parallel grooves formed in each surface of said plates forming ribs therebetween, said grooves and ribs having such dimensions that they readily interfit with the grooves and ribs of each of the adjacent plates.

8. A passenger conveyor according to claim 1, further comprising handrail means connected to and moving with said plates.

9. A passenger conveyor according to claim 1, further comprising return means including rotatable cylindrical members at the free ends of said initial and terminal portions, under said support frame means for supporting said plates as they move from the terminal portion to the initial portion.

10. A passenger conveyor according to claim 1, in which said plates are pivotally connected to said articulated parallelogram means to thereby lie in a substantially horizontal position during travel from the initial to the terminal portions and to depend substantially vertically during return travel to said initial position.